(12) United States Patent
Seo et al.

(10) Patent No.: US 8,693,424 B2
(45) Date of Patent: Apr. 8, 2014

(54) RESOURCE MAPPING METHOD AND APPARATUS IN WIRELESS COMMUNICATION SYSTEM

(75) Inventors: Dong Youn Seo, Anyang-si (KR); Suck Chel Yang, Anyang-si (KR); Jung Hoon Lee, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 145 days.

(21) Appl. No.: 13/375,712

(22) PCT Filed: Jun. 1, 2010

(86) PCT No.: PCT/KR2010/003520
§ 371 (c)(1),
(2), (4) Date: Dec. 1, 2011

(87) PCT Pub. No.: WO2010/140828
PCT Pub. Date: Dec. 9, 2010

(65) Prior Publication Data
US 2012/0087331 A1 Apr. 12, 2012

Related U.S. Application Data

(60) Provisional application No. 61/183,520, filed on Jun. 2, 2009.

(30) Foreign Application Priority Data

May 31, 2010 (KR) .................. 10-2010-0050817

(51) Int. Cl.
*H04W 4/00* (2009.01)

(52) U.S. Cl.
USPC ........... 370/329; 370/208; 370/252; 370/312; 370/328

(58) Field of Classification Search
USPC .......................... 370/208, 252, 312, 328, 329
See application file for complete search history.

(56) References Cited

U.S. PATENT DOCUMENTS

| | | | |
|---|---|---|---|
| 7,729,377 B2 * | 6/2010 | Seo et al. .................. | 370/468 |
| 8,107,374 B2 * | 1/2012 | Su et al. .................... | 370/231 |
| 8,369,424 B2 * | 2/2013 | Malladi .................... | 375/260 |
| 2010/0118800 A1 | 5/2010 | Kim et al. | |
| 2010/0208673 A1 | 8/2010 | Nam et al. | |

FOREIGN PATENT DOCUMENTS

| | | |
|---|---|---|
| KR | 10-2007-0082569 A | 8/2007 |
| KR | 10-2008-0093650 A | 10/2008 |
| KR | 10-2009-0031646 A | 3/2009 |
| WO | WO 2007/094628 A1 | 8/2007 |

* cited by examiner

*Primary Examiner* — Hassan Kizou
*Assistant Examiner* — Abdullahi Ahmed
(74) *Attorney, Agent, or Firm* — Birch, Stewart, Kolasch & Birch, LLP

(57) ABSTRACT

The present invention provided a method and an apparatus for mapping radio resources in a wireless communication system. A terminal determines the size of an RBG (resource block group of a f basic band according to the number of RBs (resource blocks) within the basic band in the overall bands which include the fundamental band and an aggregated segment band. The size of an RBG of the aggregated segment band is determined on the basis of the size of the RBG of the basic band.

15 Claims, 15 Drawing Sheets

FIG. 10

|  | C=4 | |  |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | 18 | 19 |
| 20 | 21 | 22 | 23 |
| 24 | N | 26 | N |
| 25 | N | 27 | N |

RESOURCE MAPPING METHOD AND APPARATUS IN WIRELESS COMMUNICATION SYSTEM

This application is a National Phase of PCT/KR2010/003520 filed on Jun. 1, 2010, which claims priority under 35 USC 119(e) to U.S. Provisional Application No. 61/183,520 filed on Jun. 2, 2009 and under 35 USC 119(a) to Patent Application No. 10-2010-0050817 filed in Republic of Korea, on May 31, 2010, all of which are hereby expressly incorporated by reference into the present application.

TECHNICAL FIELD

The present invention relates to wireless communications, and more particularly, to a resource mapping apparatus and method in a wireless communication system and to a resource allocation apparatus and method.

BACKGROUND ART $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas.

In 3GPP LTE, a resource block (RB) is used as a basic unit of resource allocation. The RB includes a plurality of subcarriers and a plurality of orthogonal frequency division multiplex (OFDM) symbols. The RB can be divided into a physical resource block (PRB) and a virtual resource block (VRB). According to a rule of mapping to the PRB, the VRB is divided again into a localized VRB (LVRB) and a distributed VRB (DVRB).

The VRB is used in resource allocation for downlink transmission or uplink transmission. In downlink transmission, a base station (BS) reports to a user equipment (UE) a specific VRB through which a downlink data packet is transmitted. In uplink transmission, the BS reports a specific VRB through which the UE transmits an uplink data packet.

A data transmission scheme can be divided into a frequency diversity scheduling (FDS) scheme which obtains a performance gain by using frequency diversity and a frequency selective scheduling (FSS) scheme which obtains a performance gain by using frequency selective scheduling.

In the FDS scheme, a transmitter transmits a data packet to subcarriers distributed in a frequency domain. That is, symbols in the data packet experiences channel fading in the frequency domain. By preventing all symbols in the data packet from experiencing unfavorable fading, reception performance is improved.

In the FSS scheme, the transmitter transmits a data packet by using one or a plurality of contiguous subcarriers in a favorable fading state in the frequency domain.

In a wireless communication system, a plurality of UEs are present in one cell, and a radio channel condition for each UE has a different characteristic. Therefore, even in the same subframe, one UE may need to use the FDS scheme and another UE may need to use the FSS scheme. Accordingly, it is necessary to design such that the FDS scheme and the FSS scheme can be multiplexed effectively in one subframe. The FSS scheme has a gain only when a band favored for the UE is selectively used in an overall band. On the other hand, the FDS scheme does not require selective transmission for a specific frequency band as long as a frequency interval capable of obtaining sufficient diversity is maintained, irrespective of whether the specific band is good or bad.

The FDS scheme uses the DVRB since data is transmitted by using subcarriers distributed in the frequency domain. The FSS scheme uses the LVRB since data is transmitted by using subcarriers contiguous in the frequency domain.

In recent years, there is an ongoing discussion on 3GPP LTE-advanced (LTE-A) that is an evolution of the 3GPP LTE. The 3GPP LTE-A ensures backward compatibility with the 3GPP LTE, and supports a wideband by using carrier aggregation.

It is difficult to apply a PRB-VRB mapping method in the conventional 3GPP LTE, which has a narrower band than that of the 3GPP LTE-A, directly to the wideband 3GPP LTE-A.

DISCLOSURE

Technical Problem

The present invention provides a method and apparatus for mapping a logical radio resource to a physical radio resource in a wireless communication system.

The present invention also provides a method and apparatus for allocating a radio resource in a wireless communication system.

Technical Solution

In an aspect, a method of mapping a virtual resource block (VRB) to a physical resource block (PRB) by a user equipment in a wireless communication system is provided. The method includes acquiring a VRB allocation indicating the VRB allocated in an overall band including a basic band and an aggregated segment band, determining a resource block group (RBG) size of the basic band on the basis of the number of resource blocks (RBs) within the basic band, wherein the number of RBs included in one RBG corresponds to the RBG size, determining the RBG size of the aggregated segment band to a value equal to the RBG size of the basic band, determining an RBG set by sequentially arranging RBGs within the aggregated segment band and RBGs within the basic band in a frequency domain, and mapping the VRB, which is allocated on the basis of the VRB allocation on the RBG set, to the PRB.

The VRB allocation may include an RBG bitmap indicating an allocated RBG.

The VRB allocation may include a subset indicator that indicates a selected subset and a subset bitmap that indicates an allocated VRB in the selected subset.

The VRB allocation may include a resource indication value (RIV) that specifies an RB start point and the number of allocated RBs.

The aggregated segment band may include first and second segment bands, and the first and second segment bands may be arranged at both sides of the basic band.

The number of RBs included in the aggregated segment band may be a multiple of the RBG size of the aggregated segment band.

In another aspect, a user equipment for mapping a virtual resource block (VRB) to a physical resource block (PRB) in a wireless communication system is provided. The user equipment includes a radio frequency (RF) unit for transmitting and receiving a radio signal, and a processor coupled to the RF unit and configured for acquiring a VRB allocation indicating the VRB allocated in an overall band including a basic band and an aggregated segment band, determining a resource block group (RBG) size of the basic band on the basis of the number of resource blocks (RBs) within the basic band, wherein the number of RBs included in one RBG corresponds to the RBG size, determining the RBG size of the aggregated segment band to a value equal to the RBG size of the basic band, determining an RBG set by sequentially arranging RBGs within the aggregated segment band and RBGs within the basic band in a frequency domain, and mapping the VRB, which is allocated on the basis of the VRB allocation on the RBG set, to the PRB.

In still another aspect, a method of allocating a virtual resource block (VRB) mapped to a physical resource block (PRB) by a base station in a wireless communication system is provided. The method includes determining a VRB allocation indicating the VRB allocated to a user equipment in an overall band including a basic band and an aggregated segment band, mapping the allocated VRB to the PRB, transmitting the VRB allocation to the user equipment, and transmitting a downlink data packet to the user equipment by using the PRB, wherein the mapping of the allocated VRB to the PRB comprises determining a resource block group (RBG) size of the basic band on the basis of the number of resource blocks (RBs) within the basic band, wherein the number of RBs included in one RBG corresponds to the RBG size, determining the RBG size of the aggregated segment band to a value equal to the RBG size of the basic band, determining an RBG set by sequentially arranging RBGs within the aggregated segment band and RBGs within the basic band in a frequency domain, and mapping the VRB, which is allocated on the basis of the VRB allocation on the RBG set, to the PRB.

Advantageous Effects

It provides a resource mapping and resource allocation method capable of supporting a wider band while supporting compatibility with a legacy user equipment. Frequency selective scheduling (FSS), Frequency diversity scheduling (FDS), or a combination thereof can be applied, and resource allocation information required for scheduling can be effectively implemented.

DESCRIPTION OF DRAWINGS

FIG. 10 shows an example of a block interleaver.

MODE FOR INVENTION

A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc.

A base station (BS) 11 is generally a fixed station that communicates with the UE 12 and may be referred to as another terminology, such as an evolved node-B (eNB), a base transceiver system (BTS), an access point, etc.

Each BS provides a communication service to a specific geographical region (generally referred to as a cell). The cell can be divided into a plurality of regions (referred to as sectors).

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 1:
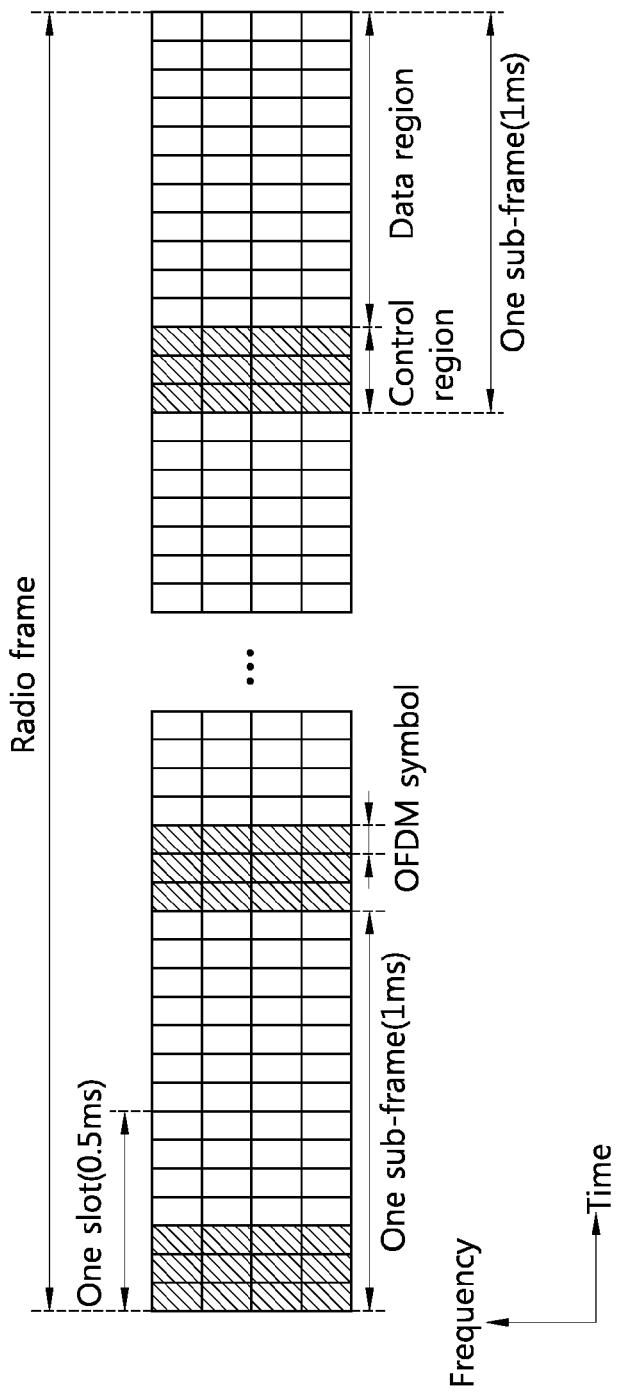
FIG. 1 shows a downlink radio frame structure in $3^{rd}$ generation partnership project (3GPP) long term evolution (LTE).

FIG. 1 shows a DL radio frame structure in $3^{rd}$ generation partnership project (3GPP) long term evolution (LTE). The section 6 of 3GPP TS 36.211 V8.5.0 (2008 December) "Evolved Universal Terrestrial Radio Access (E-UTRA); Physical Channels and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008 December), in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7×12 resource elements (REs).

A subframe is divided into a control region and a data region in the time domain. The control region includes up to three preceding OFDM symbols of a $1^{st}$ slot in the subframe. The number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.5.0 (2008 December), the LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a $1^{st}$ OFDM symbol in the subframe carries a control format indicator (CFI) regarding the number of OFDM symbols (i.e., a size of the control region) used for transmission of control channels in the subframe. The UE first receives the CFI through the PCFICH, and thereafter monitors the PDCCH.

The PHICH carries an acknowledgement (ACK)/not-acknowledgement (NACK) signal for uplink hybrid automatic repeat request (HARQ). The ACK/NACK signal for UL data transmitted by the UE is transmitted through the PHICH.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The DCI on the PDCCH is received by using blind decoding. A plurality of candidate PDCCHs can be transmitted in the control region of one subframe. The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having the DCI of the UE.

The control region in the subframe includes a plurality of control channel elements (CCEs). The CCE is a logical allocation unit used to provide the PDCCH with a code rate depending on a wireless channel. The CCE corresponds to a plurality of resource element groups (REGs). The REG includes a plurality of REs. According to a relation between the number of CCEs and the code rate provided by the CCEs, the PDCCH format and a possible number of bits of the PDCCH are determined.

Figure 2:
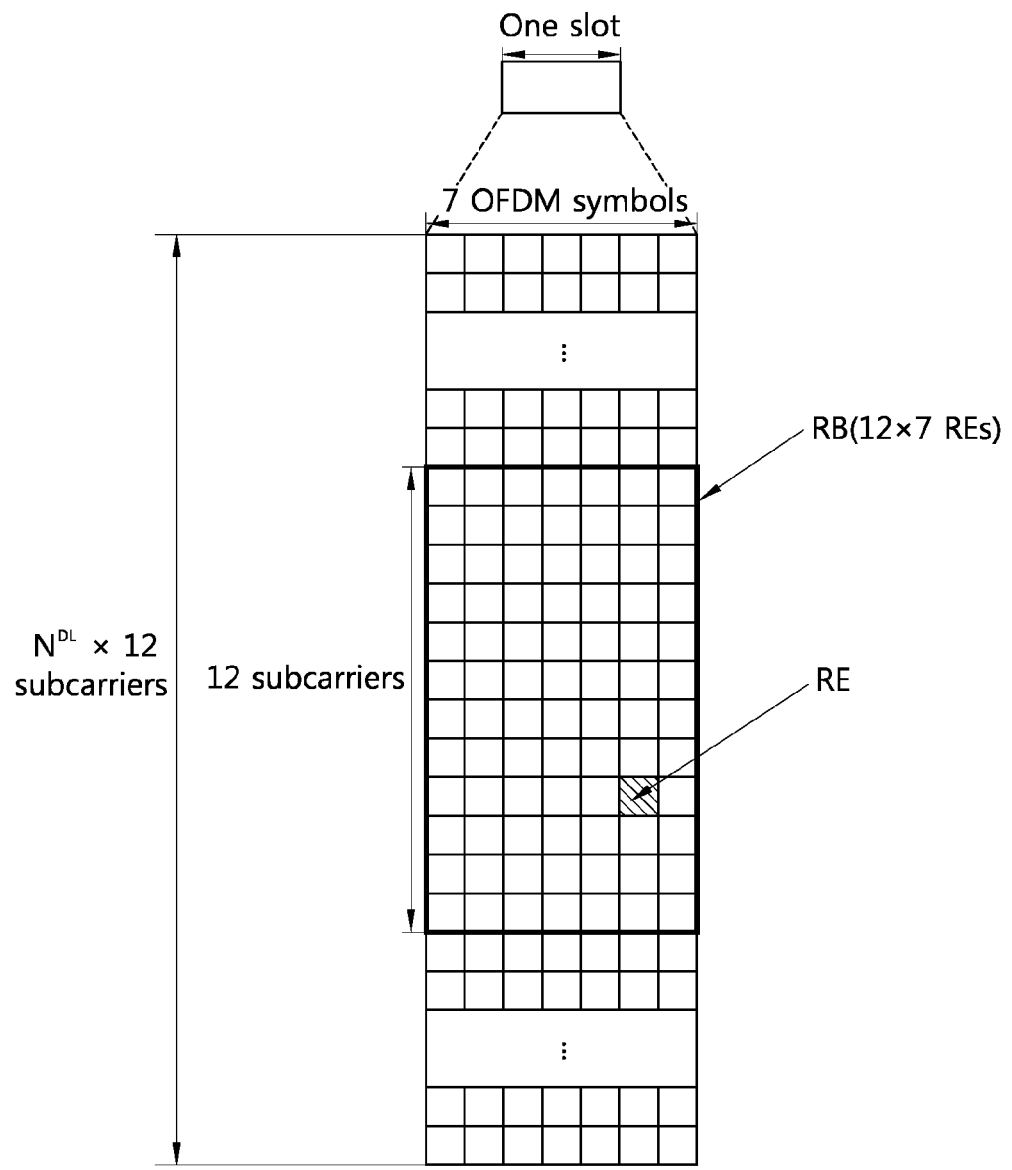
FIG. 2 shows an example of a resource grid for one downlink slot.

FIG. 2 shows an example of a resource grid for one DL slot. A UL slot is also configured in the same manner as the DL slot.

The DL slot includes a plurality of OFDM symbols in a time domain. A resource block (RB) is a resource allocation unit, and includes a plurality of subcarriers in one slot. It is described herein that one DL slot includes 7 OFDM symbols and one RB includes 12 subcarriers for exemplary purposes only, and the present invention is not limited thereto.

Each element on the resource grid is referred to as a resource element (RE), and one RB includes 12×7 REs. The number $N^{DL}_{RB}$ of RBs included in the DL slot depends on a transmission bandwidth determined in a cell.

The following terminologies are defined.

A resource element (RE) is a smallest frequency-time unit by which a modulation symbol of a data channel or a modulation symbol of a control channel is mapped. If there are M subcarriers on one OFDM symbol and if one slot includes N OFDM symbols, then one slot includes M×N REs.

A physical resource block (PRB) is a unit frequency-time resource for transmitting data. One PRB consists of a plurality of REs contiguous in a frequency-time domain, and a plurality of PRBs are defined in one subframe.

A virtual resource block (VRB) is a virtual unit resource for transmission of the data channel or the control channel. The number of REs included in one VRB is equal to the number of REs included in one PRB. For transmission of the data channel or the control channel, one VRB can be mapped to the PRB or one VRB can be mapped to a plurality of PRBs.

A localized virtual resource block (LVRB) is one type of the VRB. One LVRB is mapped to one PRB, and there is no overlapping of PRBs to which different LVRBs are mapped. The LVRB can be interpreted directly as the PRB.

A distributed virtual resource block (DVRB) is another type of the VRB. One DVRB is mapped to some REs in a plurality of PRBs, and there is no overlapping of REs which are mapped to different DVRBs.

The following parameters are defined.

'$N_D$' denotes the number of PRBs to which one DVRB is mapped. The DVRB can be divided into $N_D$ segments, and then each segment can be mapped to a different PRB.

'$N_{PRB}$' denotes the number of PRBs in the system.

'$N_{LVRB}$' denotes the number of available LVRBs in the system.

'$N_{DVRB}$' denotes the number of available DVRBs in the system.

'$N^{UE}_{LVRB}$' denotes the maximum number of LVRBs allocated to a UE.

'$N^{UE}_{DVRB}$' denotes the maximum number of DVRBs allocated to one UE.

'$N_{subset}$' denotes the number of subsets.

round(x) is a function for outputting an integer by rounding off x. ceil(x) is a function for outputting a minimum value among integers equal to or greater than x. floor(x) is a function for outputting a maximum value among integers equal to or less than x.

Now, VRB-PRB mapping in 3GPP LTE will be described.

Figure 3:
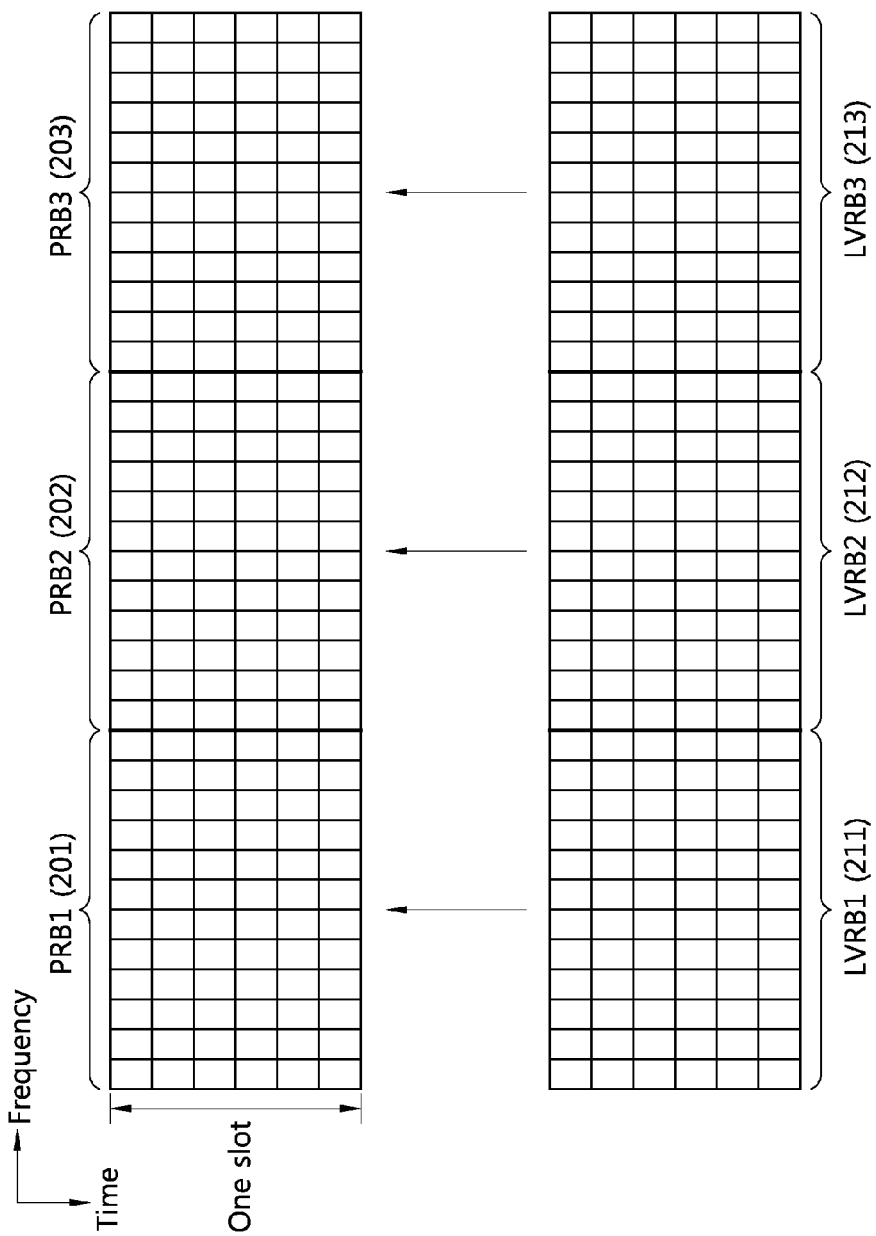
FIG. 3 shows localized virtual resource block (LVRB)-physical resource block (PRB) mapping.

FIG. 3 shows LVRB-PRB mapping. Although is it shown herein that both of an LVRB and a PRB include 12 subcarriers in one slot and one slot includes 6 OFDM symbols, the number of OFDM symbols included in one slot and the number of subcarriers included therein are for exemplary purposes only.

An LVRB1 211 is mapped to a PRB1 201. An LBRB2 212 is mapped to a PRB2 202. An LBRB3 213 is mapped to a PRB3 203. The LVRB is one-to-one mapped to the PRB. An LVRB having an index i corresponds to a PRB having an index j. According to a VRB allocation scheme, i and j may be equal to or different from each other.

Figure 4:
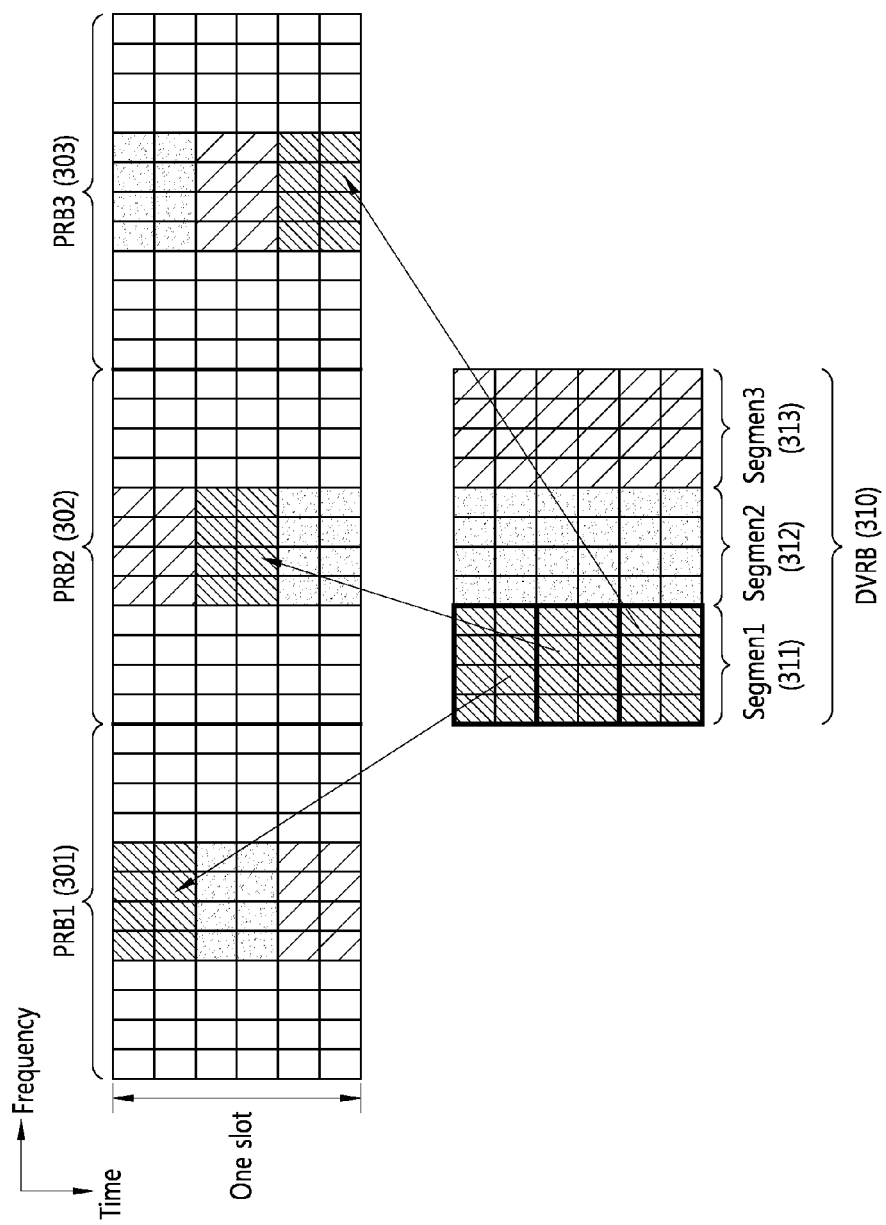
FIG. 4 shows distributed VRB (DVRB)-PRB mapping.

FIG. 4 shows DVRB-PRB mapping. A DVRB is divided into $N_D$ segments in a frequency domain. Each segment is mapped to a plurality of PRBs.

Herein, $N_D=3$. A DVRB 310 is divided into a segment1 311, a segment2 312, and a segment3 313. Each segment is divided again into three parts. The three parts are respectively mapped to a PRB1 301, a PRB2 302, and a PRB3 303.

Figure 5:
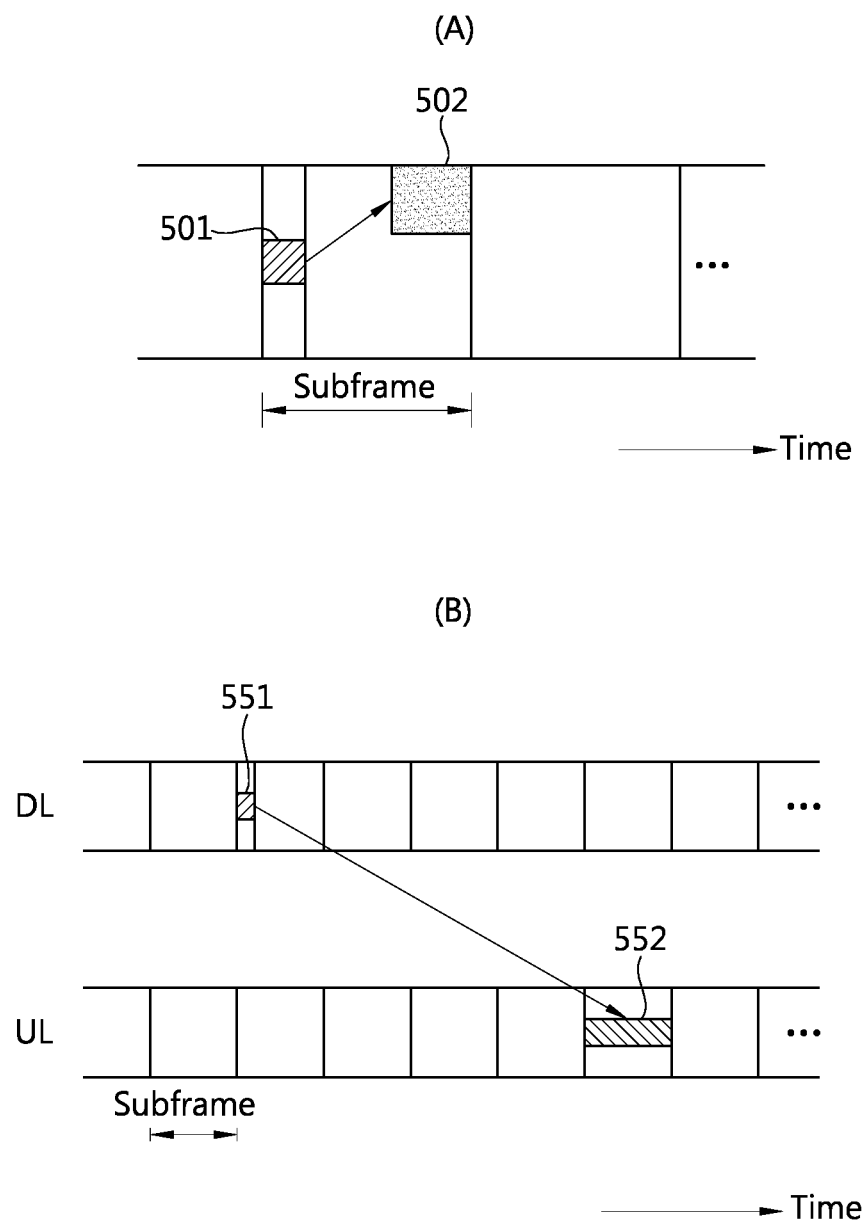
FIG. 5 shows resource allocation in 3GPP LTE.

FIG. 5 shows resource allocation in 3GPP LTE. FIG. 5A shows a DL resource allocation, and FIG. 5B shows a UL resource allocation.

For DL data reception, a UE monitors a PDCCH, and receives the DL resource allocation on a PDCCH 501. The DL resource allocation includes a VRB allocation for a PDSCH 502. The UE receives a DL data packet on the PDSCH 502 indicated by the DL resource allocation. The UE acquires a VRB mapped to a PRB, on which the PDSCH 502 is transmitted, on the basis of the VRB allocation and thus receives the DL data packet.

For UL data transmission, the UE monitors the PDCCH in a DL subframe and receives the UL resource allocation on a PDCCH 551. The DL resource allocation includes a VRB allocation for a PUSCH 552. The UE transmits a UL data packet on the PUSCH 552 configured based on the UL resource allocation. The UE maps the VRB allocated based on the VRB allocation to a PRB, and transmits the PUSCH 552 by using the mapped PRB.

As described above, by receiving the VRB allocation on the PDCCH from a BS, the UE can determine a PRB for receiving the DL data packet or for transmitting the UL data packet. In this case, it is assumed that the VRB allocation consists of a typical bitmap. If there are $N_{RB}$ VRBs, $N_{RB}$ bits are required for the bitmap. This may result in a problem in that a size of a payload of DCI transmitted on the PDCCH is increased in proportion to the number of VRBs.

Therefore, to decrease overhead of the VRB allocation, as disclosed in the section 7.1.6 of 3GPP TS 36.213 V8.5.0 (2008 December), the VRB allocation is classified into a type 0, a type 1, and a type 2, and a resource block group (RBG) and a subset are introduced.

Figure 6:
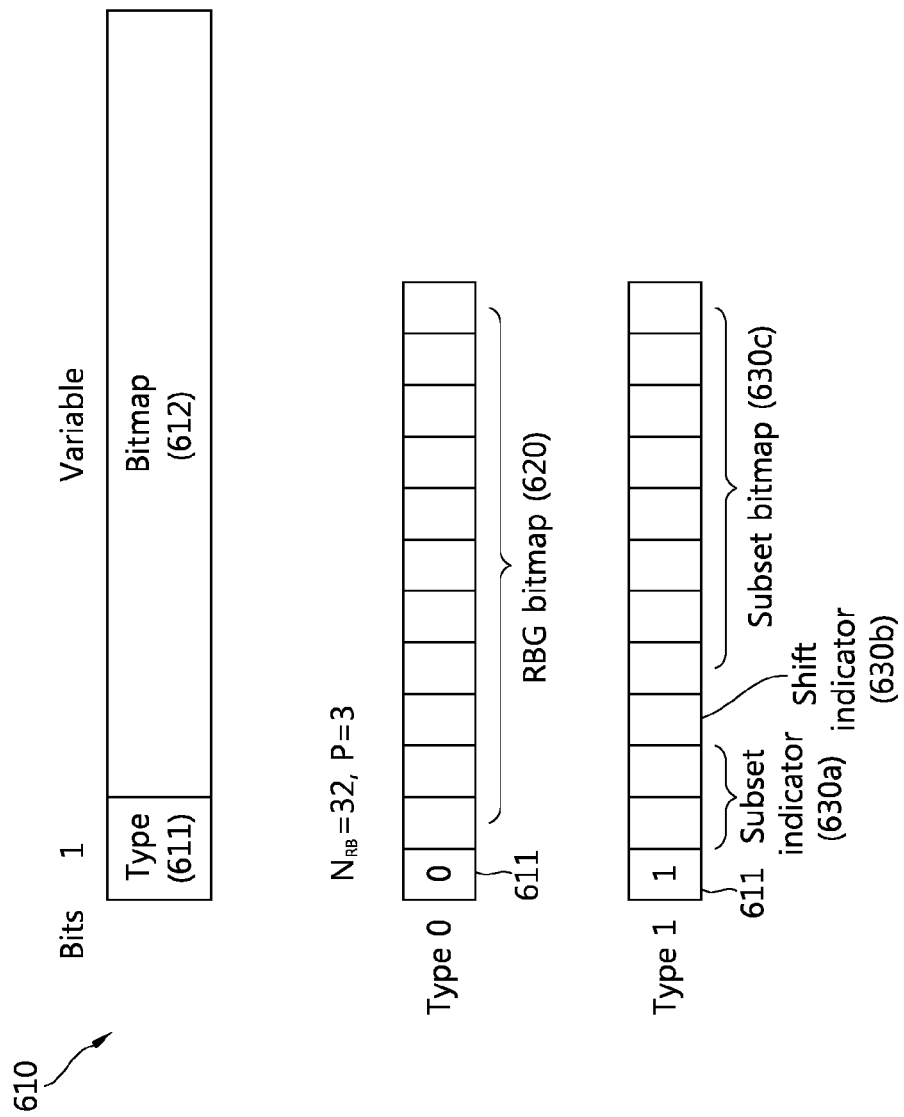
FIG. 6 shows an example of VRB allocation.

FIG. 6 shows an example of VRB allocation. A VRB allocation 610 includes a type field 611 and a bitmap field 612. The type field 611 is a 1-bit field that indicates a type of the VRB allocation. The bitmap field 612 includes bitmap information depending on the type of the VRB allocation.

If the type field 611 is set to '0', a type-0 VRB is allocated. The bitmap field 612 for the type-0 VRB allocation includes an RBG bitmap 620. An RBG is allocated in a basic unit when allocating the type-0 VRB. The RBG includes one or a plurality of contiguous VRBs. An RBG size P indicates the number of LVRBs included in the RBG.

Table 1 shows the RBG size P depending on the number of RBs.

TABLE 1

| $N_{RB}$ | RBG size P |
|---|---|
| ≤10 | 1 |
| 11~26 | 2 |
| 27~63 | 3 |
| 64~110 | 4 |

The RBG bitmap 620 has a size of $L=ceil(N_{RB}/P)$. Therefore, if $N_{RB}=32$, the P=3, and the RBG bitmap 620 has a size of L=11.

Each bit of the RBG bitmap 620 corresponds to the RBG. When $N_{RB}=32$, the number of bits required for the bitmap for allocation resources in one RB unit is 32 bits in total. However, if the resource is allocated in an RBG unit in which 3 RBs are grouped, only an 11-bit RBG bitmap is required and thus the payload size can be decreased. However, it has a disadvantage in that resource allocation cannot be achieved in a unit equal to or less than the RBG size.

If the type field 611 is set to '1', it is a type-1 VRB allocation. The bitmap field 612 for the type-1 VRB allocation includes a subset indicator 630a, a shift indicator 630b, and a subset bitmap 630c. In the type-1 VRB allocation, the subset includes a plurality of RBGs, and all RBs are divided into P subsets.

The subset indicator 630a indicates a subset selected from P subsets. The shift indicator 630b indicates a shift of resource allocation in the subset. Each bit of the subset bitmap 630c indicates a VRB in the selected subset.

If $N_{RB}=32$ and three (P=3) subsets are used, the shift indicator 630b is 2 bits. The shift indicator 630b can be set to one bit. A size of the subset bitmap 630c is equal to (L−the number of bits of the subset indicator 630a−the number of bits of the shift indicator 630b).

Figure 7:
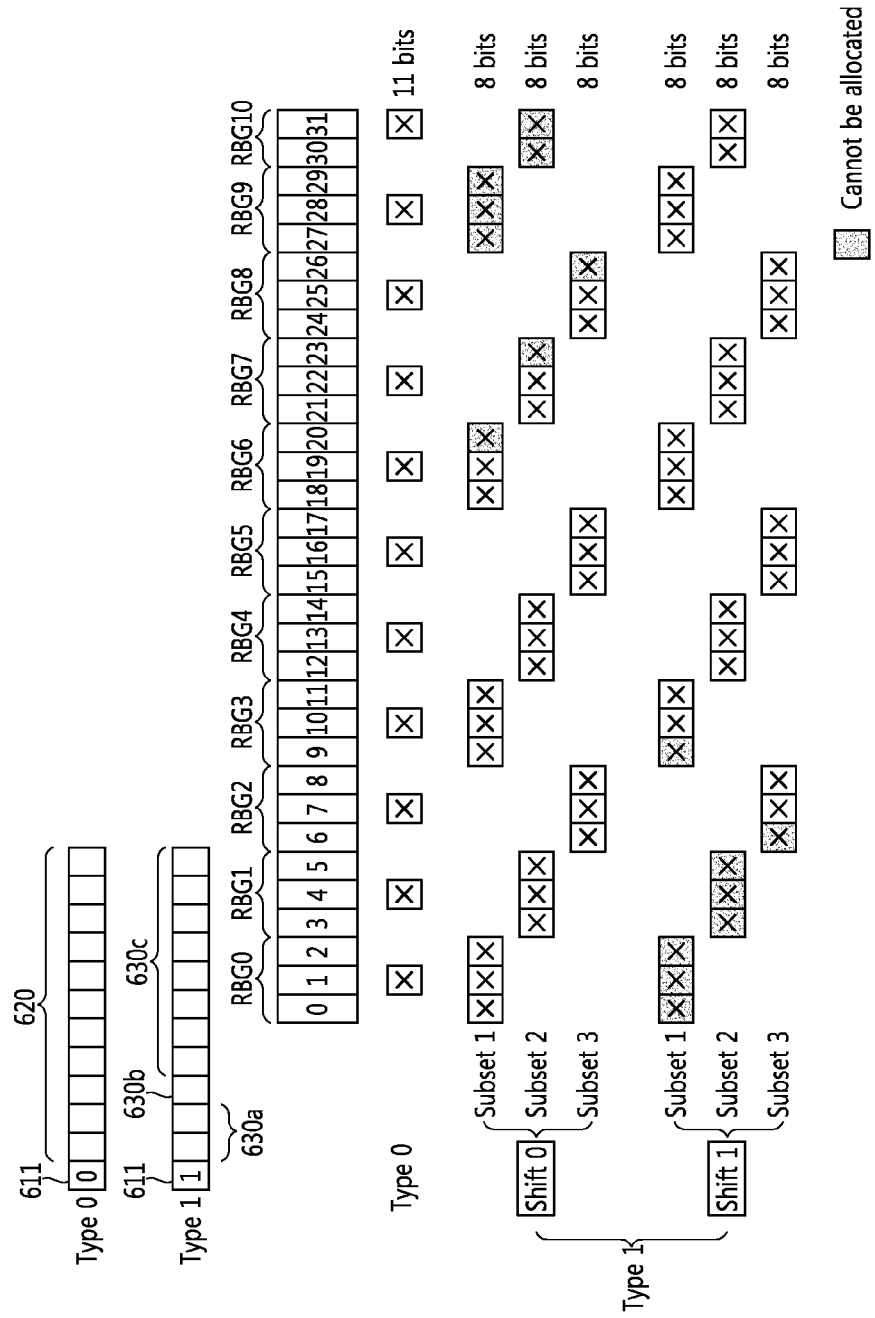
FIG. 7 shows a type-0 VRB allocation and a type-1 VRB allocation.

FIG. 7 shows a type-0 VRB allocation and a type-1 VRB allocation. Herein, $N_{RB}=N_{RPB}=32$, and there are PRB indices 0 to 31. Since P=3, there are 11 RBGs, i.e., RBG0 to RBG10.

In the type-0 VRB allocation, the RBG bitmap 620 is 11 bits. Bits of the RBG bitmap 620 respectively correspond to 11 RBGs.

In the type-1 VRB allocation, since there are three subsets, the respective RBGs are sequentially allocated to the subsets. Therefore, a subset 1 includes 12 RBs (i.e., RB0, RB1, RB2, RB9, RB10, RB11, RB18, RB19, RB20, RB27, RB28, RB29), a subset 2 includes 11 RBs (i.e., RB3, RB4, RB5, RB12, RB13, RB14, RB21, RB22, RB23, RB30, RB31), and a subset 3 includes 9 RBs (i.e., RB6, RB7, RB8, RB15, RB16, RB17, RB24, RB25, RB26).

Since the subset bitmap 630c is only 8 bits, some RBs among the RBs of each subset cannot be indicated by the subset bitmap 630c. For example, among the 12 RBs in the subset 1, 4 RBs (i.e., RB20, RB27, RB28, RB29) cannot be indicated by the subset bitmap 630c. This implies that 4 RBs cannot be allocated. Likewise, among the 11 RBs in the subset 2, 3 RBs (i.e., RB23, RB30, RB31) cannot be indicated by the subset bitmap 630c. Among the 9 RBs in the subset 3, one RB (i.e., RB 26) cannot be indicated by the subset bitmap 630c.

To solve this problem, the shift indicator 630b is used. For example, if it is assumed that a subset indicator 630a indicates a subset 1 and the shift indicator 630b is set to '0', then the subset bitmap 630c is used to indicate RB0, RB1, RB2, RB9, RB10, RB11, RB18, RB19 (see 1504). If the subset indicator 630a indicates the subset 1 and the shift indicator 630b is set to '1', the subset bitmap 630c is used to indicate RB10, RB11, RB18, RB19, RB20, RB27, RB28, RB29.

In addition to the type 0 and the type 1, there is a type-2 VRB allocation. The type-2 VRB allocation does not include the type field 611.

Figure 8:
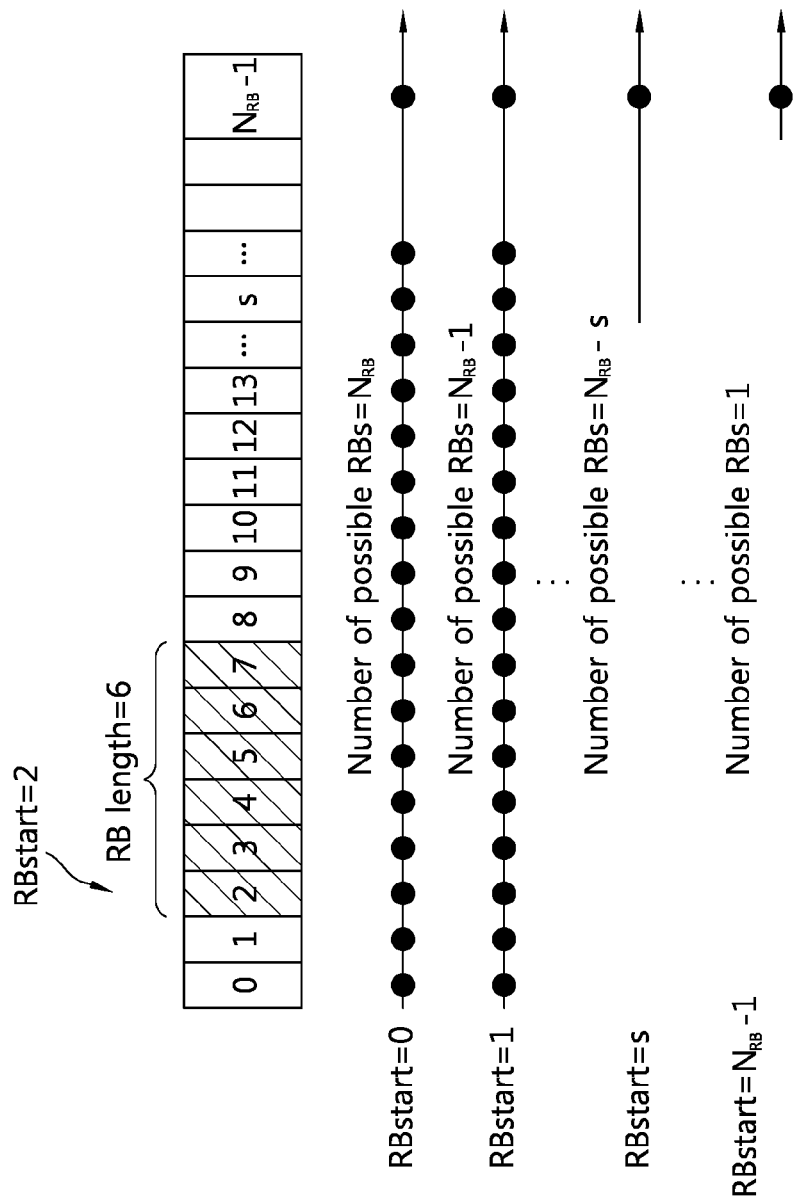
FIG. 8 shows a type-2 VRB allocation.

FIG. 8 shows a type-2 VRB allocation. The type-2 VRB allocation is allocation of a plurality of contiguous VRBs to a UE. To indicate an RB to be allocated, a start RB index and the number of contiguous RBs are required. However, in the type 2, the number of RBs is predetermined depending on a start point to decrease the number of combinations.

Referring to FIG. 8, if an RB start point is an RB with an index 0, the number of possible RB is $N_{RB}$. If the RB start point is an RB with an index 1, the number of possible RBs is $N_{RB}-1$. If the RB start point is an RB with an index s, the number of possible RBs is $N_{RB}-s$. If the RB start point is an RB with an index $N_{RB}-1$, the number of possible RBs is 1.

The type-2 VRB allocation includes a resource indication value (RIV) for designating the RB start point and the number of RBs. The number of allocation combinations is $N_{RB}(N_{RB}+1)/2$, and the number of bits of the RIV is $ceil[\log 2\{N_{RB}(N_{RB}+1)/2\}]$. If $N_{RB}=32$, the RIV can be indicated with 10 bits.

The type-0 VRB allocation and the type-1 VRB allocation are used for LVRB allocation. The type-2 VRB allocation can be used for DVRB allocation or LVRB allocation.

Figure 9:
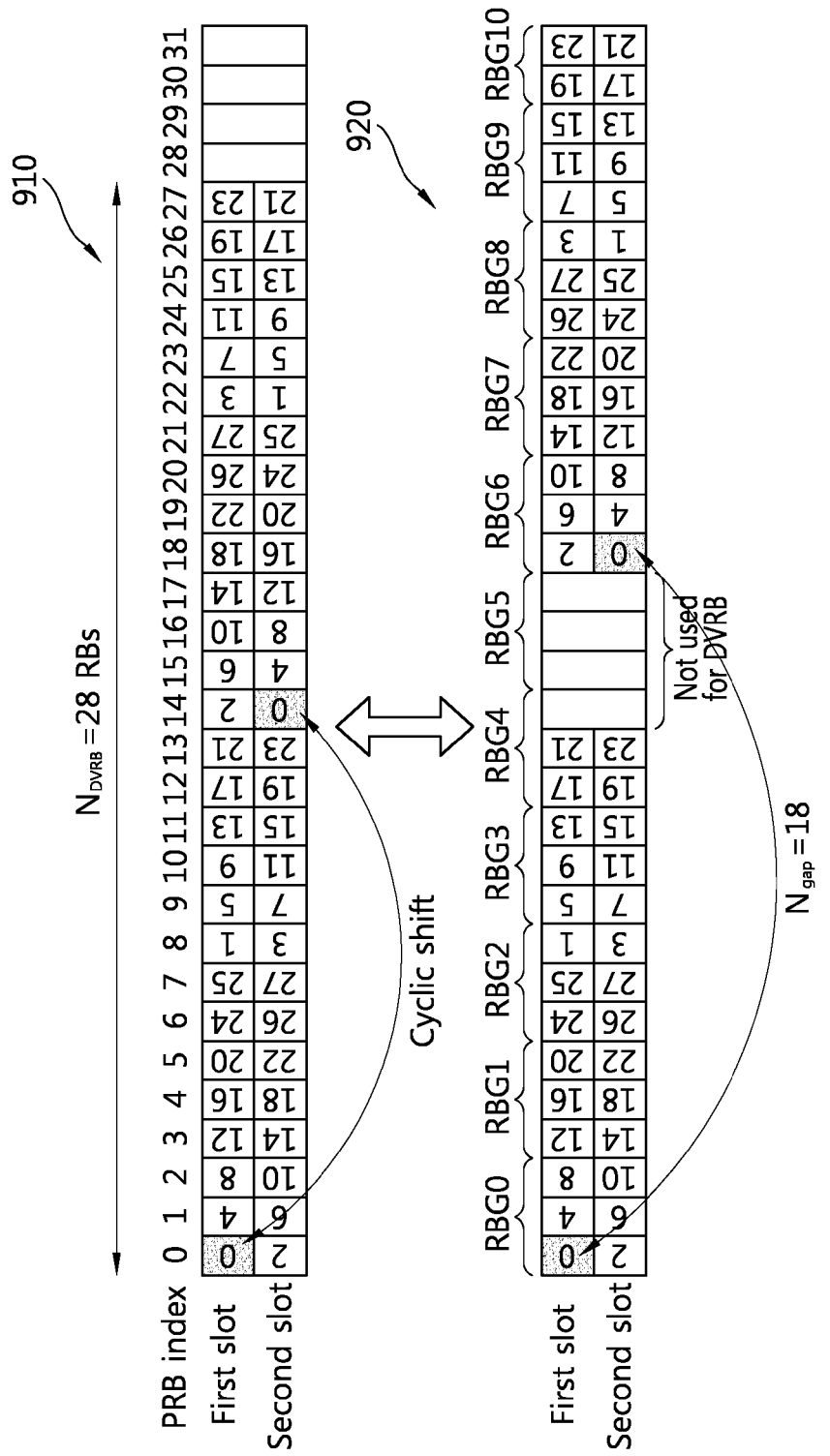
FIG. 9 shows an example of DVRB-PRB mapping.

FIG. 9 shows an example of DVRB-PRB mapping. It is assumed herein that $N_{RB}=N_{RPB}=32$, and PRB indices are numbered from 0 to 31. Upper mapping 910 is an example of not applying a gap. Lower mapping 920 is an example of applying the gap. A number written in a box indicates a DVRB index mapped to a PRB of a corresponding slot.

First, an RBG size P is determined according to a system bandwidth (i.e., $N_{RB}(=N_{PRB})$, the number of RBs) as shown in Table 1. Further, a gap size $N_{gap}$ is determined as shown in Table 2 below.

TABLE 2

| $N_{RB}$ | $N_{gap}$ |
|---|---|
| 6-10 | ceil($N_{RB}$/2) |
| 11 | 4 |
| 12-19 | 8 |
| 20-26 | 12 |
| 27-44 | 18 |
| 45-49 | 27 |
| 50-63 | 27 |
| 64-79 | 32 |
| 80-110 | 48 |

The gap size $N_{gap}$ can be obtained according to an equation:

$$N_{gap} = \text{round}(N_{RB}/2P^2)P^2.$$

$N_{DVRB} = 2\min(N_{gap}, N_{RB} - N_{gap})$, i.e., the number of DVRBs, is determined on the basis of the number $N_{RB}$ of RBs and the gap size $N_{gap}$.

In this example, P=3, $N_{gap}$=18 since $N_{RB}$=$N_{RPB}$=32. Therefore, $N_{DVRB}$=28.

According to the gap size $N_{gap}$, a size of a block interleaver for mapping a DVRB index to a PRB index is determined.

FIG. 10 shows an example of a block interleaver. The number C of columns of the block interleaver is fixed to 4, and the number R of rows thereof is determined to R=ceil($N_{DVRB}$/(C*P))P. Therefore, R=8. 'N' indicates a null value. The null value is used to match the number of DVRB indices to the size of the block interleaver, and is inserted to last {(4R−$N_{DVRB}$)/2} columns of a $2^{nd}$ row and a $4^{th}$ row.

When an input of the block interleaver is a DVRB index, the DVRB index is filled in a row-first manner. That is, after the DVRB index is completely input to the first row, a row index is increased by 1 and is then input to a next row. An output of the block interleaver is filled in a column-first manner. That is, after the first column is completely output, a column index is increased by one and then a next column is output.

The block interleaver is for mapping a plurality of contiguous DVRB indices to a PRB index in a distributed manner. According to the block interleaver of FIG. 10, an input DVRB index 0→1→2→3→4→5 is distributed to an output PRB index 0→4→8→1→16.

Referring back to FIG. 9, the interleaved DVRB index output from the block interleaver is mapped sequentially to the PRB index.

Regarding the upper mapping 910, in a first slot, an output DVRB index of the block interleaver is mapped sequentially to a PRB index. In a second slot, in order to give frequency diversity to the DVRB index mapped to the first slot, the DVRB index is cyclically shifted by $N_{DVRB}/N_D$ and is mapped to the PRB index.

If $N_D$=2, $N_{DVRB}/N_D$=14. Therefore, although a DVRB index 0 is mapped to a PRB index 0 in the first slot, a DVRB index 1 is cyclically shifted and is mapped to a PRB index 14 in the second slot.

A gap is applied to obtain a higher frequency diversity gain. The lower mapping 920 is an example of applying a gap size to the upper mapping 910. That is, a total of 28 RBs are divided into a first group and a second group, and the second group is shifted by the gap size and is then mapped to a PRB index. Since a start point of the gap size is a PRB index at which the first group starts, a first PRB index to which a first DVRB index of the second group is mapped is defined by being separated by the gap size from the PRB index at which the first group starts.

In the lower mapping 920, (a first DVRB index of the first slot, a first DVRB index of the second slot) of the second group is (2,0). Before applying the gap size, (2,0) is mapped to the PRB index 14. When the gap size is applied, (2,0) is mapped to a PRB index 18.

By applying the gap size, the first group and the second group are separated from each other by $N_{offset}$. Herein, $N_{offset} = N_{gap} - N_{DVRB}/2 = 4$. Therefore, between the first group and the second group, there are $N_{offset}$ PRBs, to which the DVRB is not mapped. Accordingly, the DVRB is not mapped to a PRB having a PRB index 14, 15, 16, and 17.

By performing DVRB-PRB mapping described above, a diversity order becomes 4, and thus a diversity gain can be obtained.

Now, embodiments of the present invention applied to a wireless communication system that supports a wider band than that of 3GPP LTE will be described.

A 3GPP LTE-A system ensures backward compatibility with the conventional 3GPP LTE, and supports carrier aggregation for wideband communication. In addition, for effective use of a system resource, a structure of an independent region consisting of RBs is proposed on which only a data channel is transmitted without a control channel.

Figure 11:
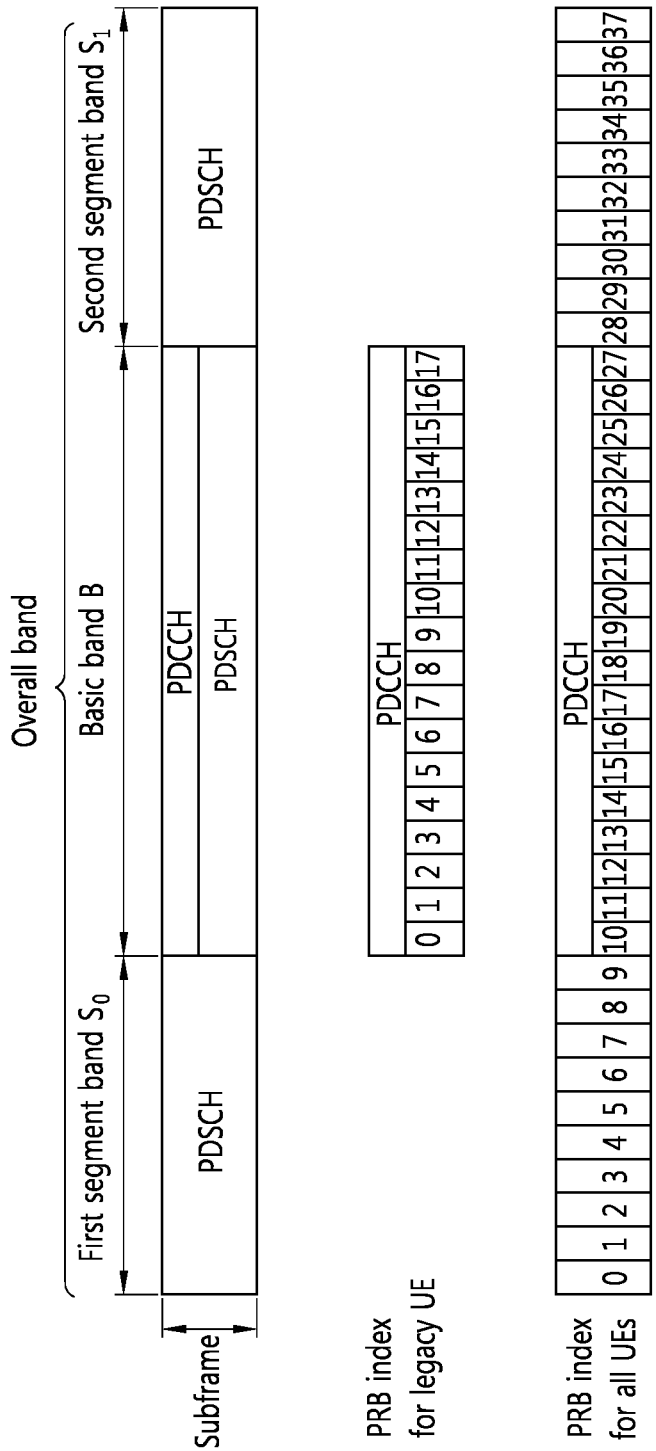
FIG. 11 shows an example of a wideband system.

FIG. 11 shows an example of a wideband system.

An overall band includes a basic band B and at least one segment band. Although it is shown herein that two segment bands, i.e., a first segment band $S_0$ and a second segment band $S_1$, are arranged at both sizes of the basic band B, the number of segment bands or positions of the segment bands are for exemplary purposes only.

The basic band B is a band for providing compatibility to the 3GPP LTE, and is for a legacy UE that supports 3GPP LTE. A subframe in the basic band B includes a control region for a PDCCH and a data region for a PDSCH similarly to a subframe of the conventional 3GPP LTE.

The segment bands $S_0$ and $S_1$ are bands for supporting an extended band that is wider than that of 3GPP LTE. A subframe in the segment bands $S_0$ and $S_1$ can include only the data region for the PDSCH. Alternatively, a subframe in the segments $S_0$ and $S_1$ can include both a control region for a PDCCH and a data region for a PDSCH.

Hereinafter, a UE capable of recognizing the basic band and the segment band is referred to as a UE, and a UE capable of recognizing only the basic band is referred to as a legacy UE.

A PRB index is given to a subframe in the basic band B in the same manner as the conventional method. For example, $N_{RB}$=18, and a PRB index may be numbered from 0 to 17.

A UE capable of fully recognizing an overall band can utilize a PRB in an additional segment band. If one segment band includes 10 PRBs, as shown in FIG. 11, 38 PRBs are present in the overall band, and are indexed with PRB indices 0 to 27.

This implies that VRB-PRB mapping can be differently achieved between a legacy UE that recognizes only the basic band B and a UE that can full recognize the overall band. However, it may result in the increase in system complexity.

A method for VRB-PRB mapping will be proposed in a situation where UEs that support different bands coexist.

For clarity, it is assumed hereinafter that the basic band B includes 18 RBs, and each of the two segment bands $S_0$ and $S_1$ include 10 RBs.

Figure 12:
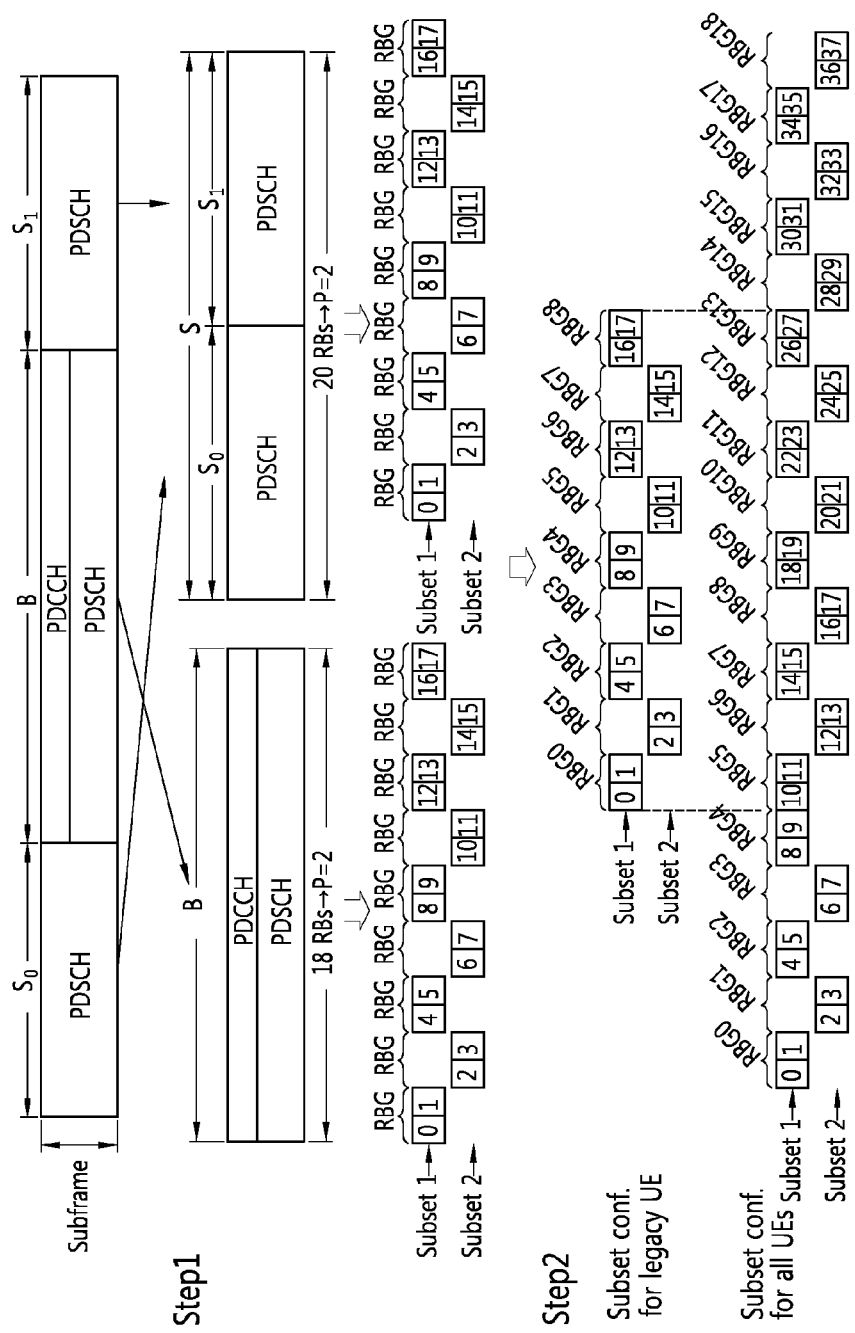
FIG. 12 shows an example of a resource mapping method according to an embodiment of the present invention.

FIG. 12 shows an example of a resource mapping method according to an embodiment of the present invention.

In step 1, VRB-PRB mapping is performed in a basic band B in the same manner as a mapping rule of the conventional 3GPP LTE. P=2 since there are 18 RBs. The mapping rule can use any of type-0 VRB allocation, type-1 VRB allocation, and type-2 VRB allocation. Type-1 VRB allocation using a subset is shown herein.

Two segment bands $S_0$ and $S_1$ are aggregated to constitute an aggregated segment band S. Since each of the two segment bands $S_0$ and $S_1$ includes 10 RBs, the aggregated segment band S includes 20 RBs. In this case, irrespective of the number of RBs in the aggregated segment band B, an RBG size of the aggregated segment band is equal to an RBG size P of the basic band B.

By setting the RBG size of the aggregated segment band according to the RBG size of the basic band B, a VRB allocation of the conventionally used RBG unit can be directly used in the aggregated segment band.

In step 2, the first segment band $S_0$, the basic band B, and the second segment band $S_1$ are arranged again in an original frequency domain order, and RBGs included therein are indexed from RBG0 to RBG18, thereby constituting a PRB set. VRB-PRB mapping is performed in the PRB set.

In a system in which bands recognized by a plurality of UEs have different sizes and which includes a basic band smaller than an overall band, an aggregated segment band is configured by aggregating segment bands other than the basic band. The aggregated segment band constitutes an RBG in an RBG unit that is the same as the basic band.

Therefore, the same mapping rule that is conventionally used can apply to the legacy UE that supports the basic band. In addition, a UE that supports the overall band can apply the same mapping rule as that used conventionally, with respect to more RBs than the legacy UE.

The number of RBs included in each segment band or the number of RBs included in the aggregated segment band can be limited to be a multiple of the RBG size. This is because when it is set to any number of RBs, the RBG may not have RBs with an RBG size or the RBG may be split into several segments.

Figure 13:
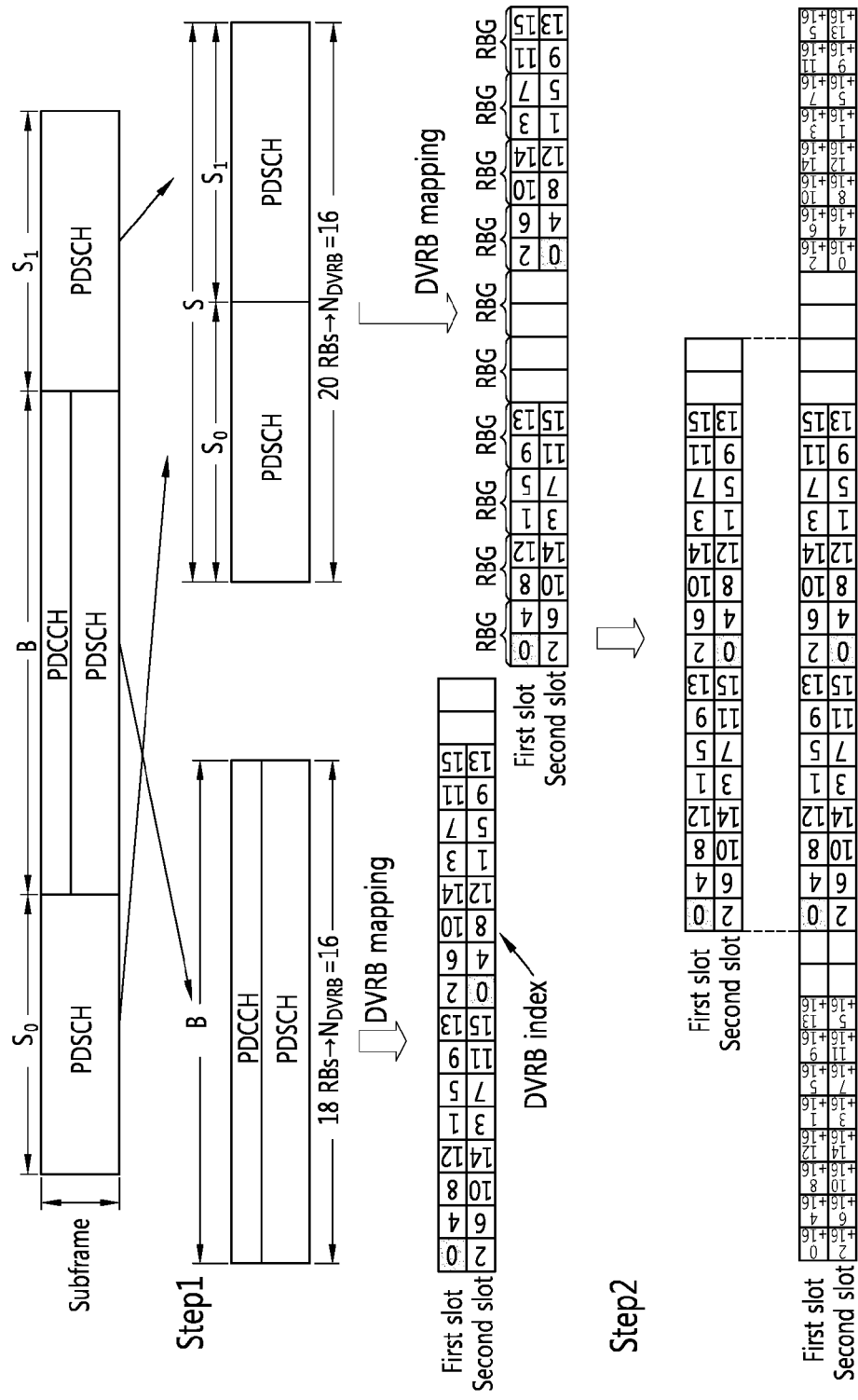
FIG. 13 shows an example of a resource mapping method according to an embodiment of the present invention.

FIG. 13 shows an example of a resource mapping method according to an embodiment of the present invention. In comparison with the embodiment of FIG. 12, the example of FIG. 13 is applied to DVRB mapping.

Since a basic band B has $N_{RB}$=18, according to Table 2, $N_{gap}$=8 and $N_{DVRB}$=2 min($N_{gap}$, $N_{RB}-N_{gap}$)=16. Last two PRBs are not mapped to a DVRB.

Since an aggregated segment band S has $N_{RB}$=20, according to Table 2, $N_{gap}$=12 and $N_{DVRB}$=2 min($N_{gap}$, $N_{RB}-N_{gap}$)=16. $N_{offset}$ is 4, and 4 PRBs in the middle are not mapped to the DVRB.

In step 2, the first segment band $S_0$, the basic band B, and the second segment band $S_1$ are arranged again in an original frequency domain order. Since DVRB indices 0 to 15 are used in the basic band B, an offset of 16 is applied in each segment region to use DVRB indices 16 to 31. The offset of 16 corresponds to the number of PRBs that can be allocated to the DVRB in the basic band B. Therefore, the DVRB is first mapped to the PRB in the basic band B, and the DVRB is subsequently mapped to the PRB in the segment band.

As described above, a VRB allocation for the DVRB includes an RIV. The RIV can be indicated into one field that specifies an allocated RB start point and the number of allocated RBs. In order to represent the VRB allocation in the segment band into the RIV, a value obtained by adding an offset to the RIV of the basic band can be used. The offset corresponds to the number of PRBs that can be allocated to the DVRB in the basic band. Therefore, when the UE knows the offset, the allocated RB start point in the segment band can be known by adding the offset from the RB start point indicated by the RIV even if the received RIV is the same as the old RIV.

Figure 14:
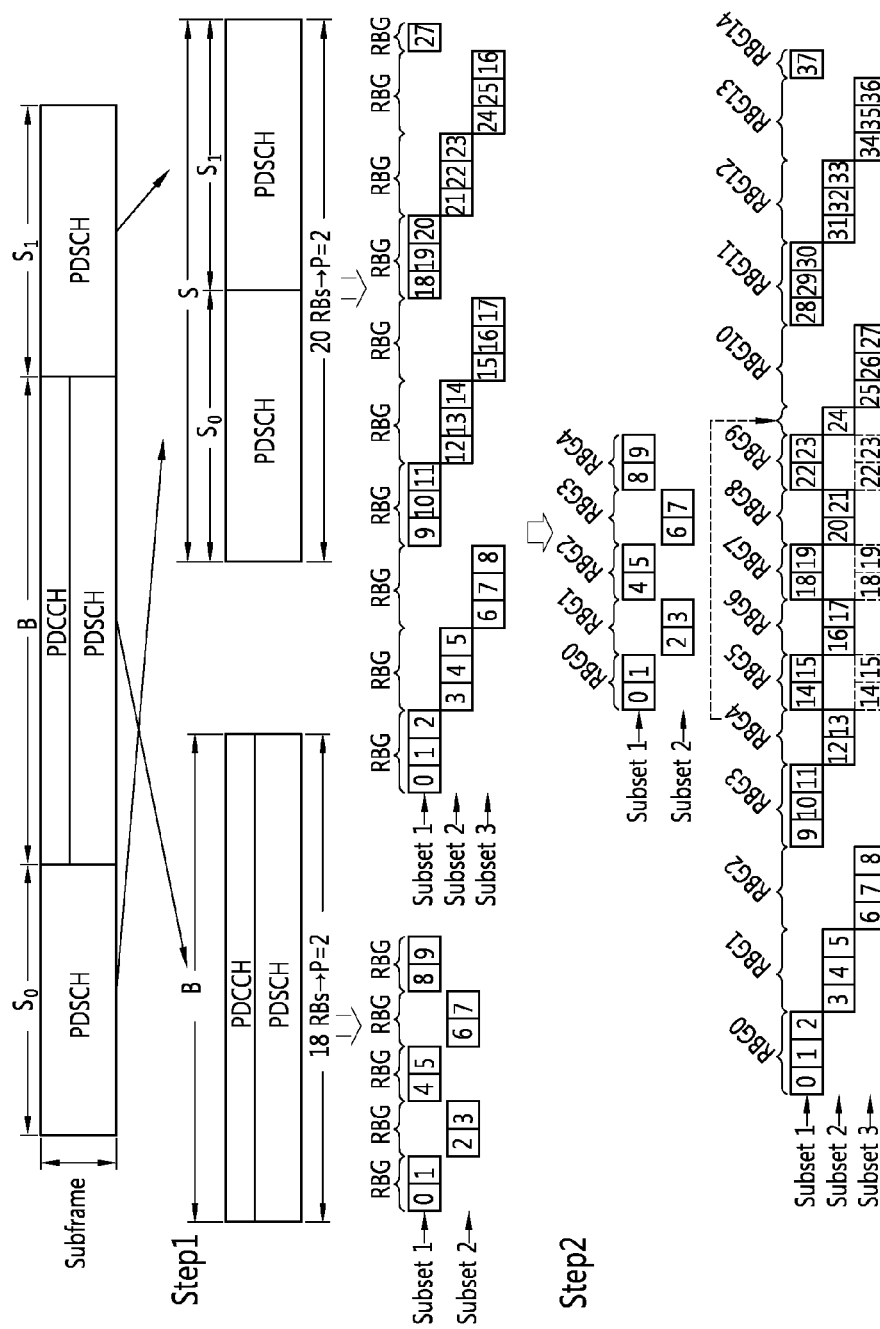
FIG. 14 shows an example of a resource mapping method according to an embodiment of the present invention.

FIG. 14 shows an example of a resource mapping method according to an embodiment of the present invention. In comparison with the embodiment of FIG. 12, an aggregated segment band uses an independent RBG size in the example of FIG. 14.

A basic band B includes 10 RBs, and P=2 according to Table 1. Similarly to the mapping rule of the conventional 3GPP LTE, the mapping rule can use any of type-0 VRB allocation, type-1 VRB allocation, and type-2 VRB allocation. Type-1 VRB allocation using a subset is shown herein.

Two segment bands $S_0$ and $S_1$ are aggregated to constitute an aggregated segment band S. When each of the two segment bands $S_0$ and $S_1$ includes 14 RBs, the aggregated segment band S includes 28 RBs. Referring to Table 1, an RBG size of the aggregated segment band S is $P_S$=3. Therefore, the aggregated segment band S consists of three subsets whereas the basic band B consists of two subsets.

In step 2, the first segment band $S_0$, the basic band B, and the second segment band $S_1$ are arranged again in an original frequency domain order, and RBGs included therein are indexed from RBG0 to RBG14.

A UE that supports an overall band can perform VRB allocation by using a greater size between an RBG size of the basic band B and an RBG size of the aggregated segment band S. However, if the RBG size of the basic band B and the RBG size of the aggregated segment band S are different from each other, the number of subsets of the two bands also differs, and thus there is a need to match a subset to a greater RBG size. Herein, as indicated by a dotted line in FIG. 14, a subset 3 of the basic band B is configured by repeating a subset 1 for example.

In the example of FIG. 14, RBs included in the RBG4 are split by definition. To avoid split of the RBG, the number of RBs included in each segment band or the number of RBs included in the aggregated segment band can be restricted to be a multiple of the RBG size.

A resource mapping and resource allocation scheme capable of supporting a wider band while supporting compatibility to a legacy UE is provided. FSS-type scheduling and FDS-type scheduling can be effectively applied, and resource allocation information required for scheduling can be effectively implemented.

Figure 15:
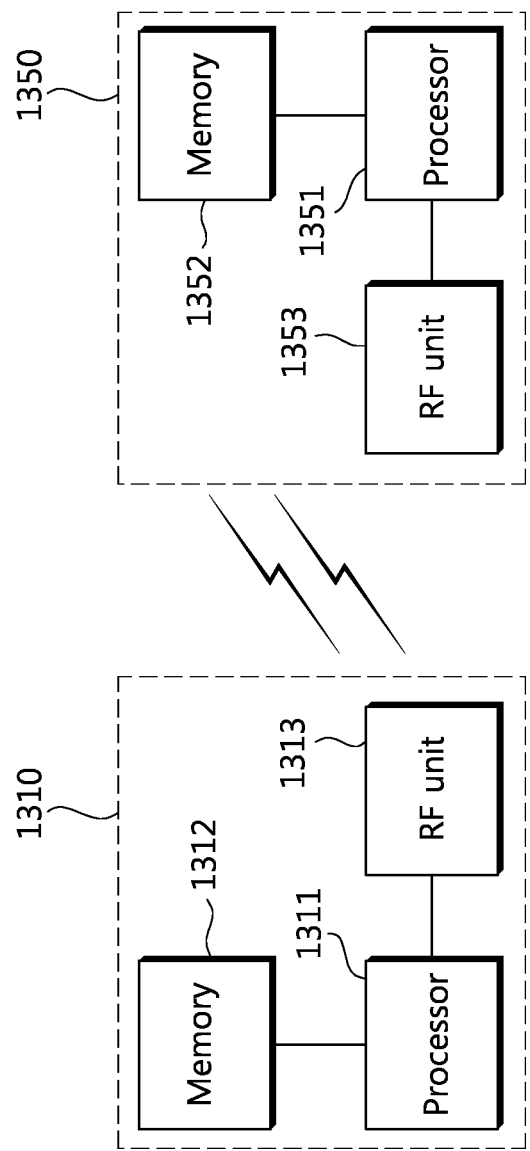
FIG. 15 is a block diagram showing a wireless communication system for implementing an embodiment of the present invention.

FIG. 15 is a block diagram showing a wireless communication system for implementing an embodiment of the present invention.

A BS 1310 includes a processor 1311, a memory 1312, and a radio frequency (RF) unit 1313.

The processor 1311 implements the proposed functions, procedures, and/or methods. An operation of the BS can be implemented by the processor 1311 in the aforementioned embodiments of FIG. 12 to FIG. 14. The memory 1312 is coupled to the processor 1311, and stores a protocol or parameter for an operation. The RF unit 1313 is coupled to the processor 1311, and transmits and/or receives a radio signal.

The processor 1311 can determine a VRB allocation that indicates a VRB allocated to a UE, and can map the allocated VRB to a PRB. The VRB allocation is transmitted to the UE, and a DL data packet is transmitted to the UE by using the PRB. The VRB allocation can use any of a type 0, a type 1, and a type 2.

A UE 1350 includes a processor 1351, a memory 1352, and an RF unit 1353.

The processor 1351 implements the proposed functions, procedures, and/or methods. An operation of the UE can be implemented by the processor 1351 in the aforementioned embodiments of FIG. 12 to FIG. 14. The memory 1352 is coupled to the processor 1351, and stores a protocol or parameter for an HARQ operation. The RF unit 1353 is coupled to the processor 1351, and transmits and/or receives a radio signal.

The processor 1351 monitors a PDCCH, and acquires a VRB allocation. The processor 1351 can receive a DL data packet or transmit a UL data packet by mapping a VRB allocated based on the VRB allocation to the PRB.

The processors 1311 and 1351 may include an application-specific integrated circuit (ASIC), a separate chipset, a logic circuit, and/or a data processing unit. The memories 1312 and 1352 may include a read-only memory (ROM), a random access memory (RAM), a flash memory, a memory card, a storage medium, and/or other equivalent storage devices. The RF units 1313 and 1353 may include a base-band circuit for processing a radio signal. When the embodiment of the present invention is implemented in software, the aforementioned methods can be implemented with a module (i.e., process, function, etc.) for performing the aforementioned functions. The module may be stored in the memories 1312 and 1352 and may be performed by the processors 1311 and 1351. The memories 1312 and 1352 may be located inside or outside the processors 1311 and 1351, and may be coupled to the processors 1311 and 1351 by using various well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method of mapping a virtual resource block (VRB) to a physical resource block (PRB) by a user equipment (UE) in a wireless communication system, the method comprising:
    acquiring, by the UE capable of aggregating carriers, one of which is used for a basic band and the others of which are used for at least one additional segment band, thereby extending a system bandwidth, a VRB allocation indicating the VRB allocated in the extended system bandwidth including the basic band and the additional segment band;
    determining, by the UE, a resource block group (RBG) size of the basic band on the basis of the number of resource blocks (RBs) within the basic band, wherein the number of RBs included in one RBG corresponds to the RBG size;
    determining, by the UE, the RBG size of the additional segment band based on the RBG size of the basic band irrespective of the number of RBs in the additional segment band such that the RBG size of the additional segment band is equal to the RBG size of the basic band;
    determining, by the UE, an RBG set by sequentially arranging RBGs within the additional segment band and RBGs within the basic band in a frequency domain; and
    mapping, by the UE, the VRB, which is allocated on the basis of the VRB allocation on the RBG set, to the PRB.

2. The method of claim 1, wherein the VRB allocation includes an RBG bitmap indicating an allocated RBG.

3. The method of claim 1, wherein the VRB allocation includes a subset indicator that indicates a selected subset and a subset bitmap that indicates an allocated VRB in the selected subset.

4. The method of claim 1, wherein the VRB allocation includes a resource indication value (RIV) that specifies an RB start point and the number of allocated RBs.

5. The method of claim 4, wherein the allocated RB start point indicated by the RIV is an RB start point in the basic band, and a value obtained by adding the allocated RB start point and an offset is used as an RB start point in the additional segment band.

6. The method of claim 5, wherein the offset corresponds to the number of RBs that can be allocated in the basic band.

7. The method of claim 1, wherein the additional segment band includes at least one segment band.

8. The method of claim 7, wherein the additional segment band includes first and second segment bands, and the first and second segment bands are arranged at both sides of the basic band.

9. The method of claim 1, wherein the number of RBs included in the additional segment band is a multiple of the RBG size of the additional segment band.

10. The method of claim 1, wherein the VRB allocation is received on a physical downlink control channel (PDCCH).

11. A user equipment for mapping a virtual resource block (VRB) to a physical resource block (PRB) in a wireless communication system, comprising:
    a radio frequency (RF) unit for transmitting and receiving a radio signal; and
    a processor coupled to the RF unit and configured to:
        aggregate carriers, one of which is used for a basic band and the others of which are used for at least one additional segment band, thereby extending a system bandwidth;
        acquire a VRB allocation indicating the VRB allocated in the extended system bandwidth including the basic band and the additional segment band;
        determine a resource block group (RBG) size of the basic band on the basis of the number of resource blocks (RBs) within the basic band, wherein the number of RBs included in one RBG corresponds to the RBG size;
        determine the RBG size of the additional segment band to based on the RBG size of the basic band;
        determine an RBG set by sequentially arranging RBGs within the additional segment band and RBGs within the basic band in a frequency domain; and
        map the VRB, which is allocated on the basis of the VRB allocation on the RBG set, to the PRB.

12. A method of allocating a virtual resource block (VRB) mapped to a physical resource block (PRB) by a base station in a wireless communication system, the method comprising:
    determining a VRB allocation indicating the VRB allocated to a user equipment (UE) capable of aggregating carriers, one of which is used for a basic band and the others of which are used for at least one additional segment band, thereby extending a system bandwidth, in an overall band including a basic band and an additional segment band;

mapping the allocated VRB to the PRB;

transmitting the VRB allocation to the user equipment; and transmitting a downlink data packet to the user equipment by using the PRB, wherein the mapping of the allocated VRB to the PRB comprises:

determining a resource block group (RBG) size of the basic band on the basis of the number of resource blocks (RBs) within the basic band, wherein the number of RBs included in one RBG corresponds to the RBG size;

determining the RBG size of the additional segment band based on the RBG size of the basic band irrespective of the number of RBs in the additional segment band such that the RBG size of the additional segment band is equal to the RBG size of the basic band;

determining an RBG set by sequentially arranging RBGs within the additional segment band and RBGs within the basic band in a frequency domain; and mapping the VRB, which is allocated on the basis of the VRB allocation on the RBG set, to the PRB.

13. The method of claim 12, wherein the VRB allocation includes an RBG bitmap indicating an allocated RBG.

14. The method of claim 12, wherein the VRB allocation includes a subset indicator that indicates a selected subset and a subset bitmap that indicates an allocated VRB in the selected subset.

15. The method of claim 12, wherein the number of RBs included in the additional segment band is a multiple of an RBG size of the additional segment band.

* * * * *